(12) United States Patent
Gould et al.

(10) Patent No.: US 7,232,540 B2
(45) Date of Patent: Jun. 19, 2007

(54) RADIATION-CURABLE COATINGS FOR PLASTIC SUBSTRATES FROM MULTIFUNCTIONAL ACRYLATE OLIGOMERS

(75) Inventors: Michael Gould, Powell, OH (US); Matthew S. Sheridan, Powell, OH (US); Thomas L. Marino, Toledo, OH (US); Alexandre Mejiritski, Bowling Green, OH (US); Dustin B. Martin, Monroe, MI (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 10/836,747

(22) Filed: May 2, 2004

(65) Prior Publication Data

US 2005/0245631 A1    Nov. 3, 2005

(51) Int. Cl.
*C08F 2/46*   (2006.01)
*B29C 35/08*  (2006.01)
*B29C 35/10*  (2006.01)
*B29C 35/00*  (2006.01)

(52) U.S. Cl. ............. 264/494; 264/495; 264/446; 264/447; 264/448; 428/411.1; 428/500; 522/71; 522/81; 522/173; 522/174; 522/178; 522/100; 522/104; 522/90; 522/96; 522/181; 522/182; 522/183; 522/904

(58) Field of Classification Search .......... 522/71, 522/81, 173, 174, 178, 100, 104, 90, 96, 522/97, 181, 182, 183, 904; 428/411.1, 500; 264/446, 447, 448, 494, 495
See application file for complete search history.

(56) References Cited

U.S. PATENT DOCUMENTS

| 5,945,489 A | 8/1999 | Moy et al. |
| 6,025,410 A | 2/2000 | Moy et al. |
| 6,706,414 B1* | 3/2004 | Dammann et al. ......... 428/524 |
| 2003/0073757 A1* | 4/2003 | Moy et al. ................. 522/176 |

OTHER PUBLICATIONS

Norbert Moszner et al., Reaction behaviour of monomeric β-ketoesters, 4 Polymer network formation by Michael reaction of multifunctional acetoacetates with multifunctional acrylates, Macromol, Rapid Commun. 16, 135-138 (1995).

* cited by examiner

*Primary Examiner*—Sanza L. McClendon (57) ABSTRACT

The present invention relates to radiation-curable coating formulations specifically for plastic substrates. The present invention specifically relates to resinous Michael addition products of β-dicarbonyl compounds and Lewis-functional multifunctional acrylate esters. The present invention further relates to methods of fabricating and using the inventive compounds.

13 Claims, 3 Drawing Sheets

Figure 1.

Scheme 1.

RADIATION-CURABLE COATINGS FOR PLASTIC SUBSTRATES FROM MULTIFUNCTIONAL ACRYLATE OLIGOMERS

FIELD OF THE INVENTION

The present invention relates generally to a family of radiation-curable coatings specifically for plastic substrates. These inventive coatings are based on multifunctional acrylate resins formed by the reaction of acrylate monomers and oligomers with β-keto esters (e.g., acetoacetates), β-diketones (e.g., 2,4-pentanedione), β-keto amides (e.g., acetoacetanilide, acetoacetamide), and/or other β-dicarbonyl compounds that can participate in Michael addition reactions. The present invention further relates to radiation-cured coatings, curable in the absence of exogenous photoinitiators.

BACKGROUND

The information provided below is not admitted to be prior art to the present invention, but is provided solely to assist the understanding of the reader.

Acrylate, methacrylate and other unsaturated monomers are widely used in coatings, adhesives, sealants, and elastomers, and may be crosslinked by ultraviolet light in the presence of photoinitiators or by peroxide-initiated free radical cure. These photoinitiators and/or peroxides are typically low molecular weight multifunctional compounds that may be volatile or absorbed through skin and can cause adverse health effects. Functionalized oligomeric photoinitiators may overcome some of these drawbacks; generally, polymeric photoinitiators are nonvolatile compounds, not readily absorbed through skin. However, multistep syntheses may be required, low functionality may be detrimental to reactivity and final properties, and catalyst or initiator may still be required to effect crosslinking.

The Michael addition of acetoacetate donor compounds to multifunctional acrylate receptor compounds to make crosslinked polymers has been described in the literature. For example, Mozner and Rheinberger reported the Michael addition of acetoacetates to triacrylates and tetraacrylates. (16 Macromolecular Rapid Communications 135 (1995)). The products formed were crosslinked gels. In one such reaction, depicted in FIG. 1, Mozner added one mole of trimethylol propane triacrylate (TMPTA) having 3 functional groups to one mole of polyethylene glycol (600 molecular weight) diacetoacetate (PEG600-DAA) having two functional groups. (Each acetoacetate "functional group" reacts twice, thus each mole of diacetoacetate has four reactive equivalents.)

Figure 1:
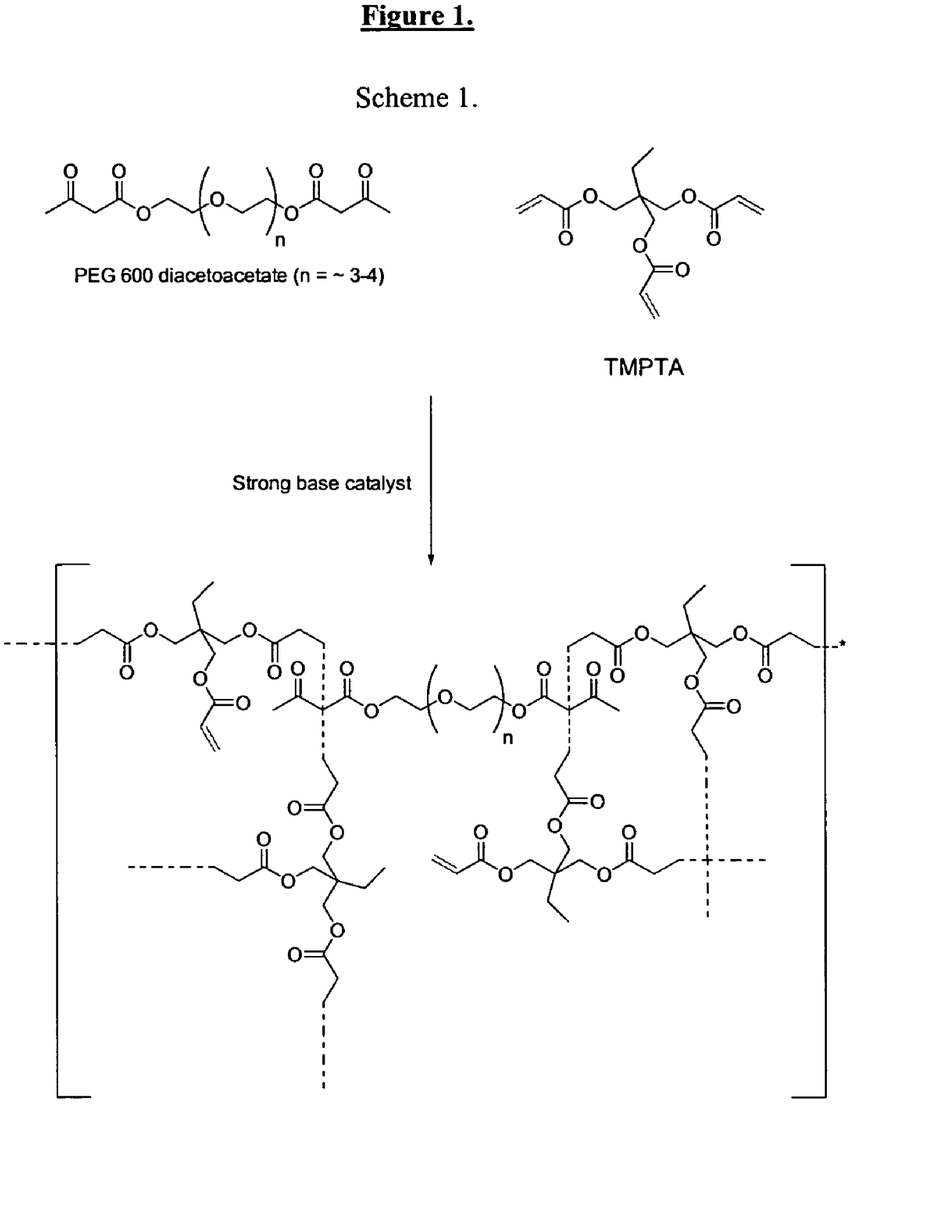
FIG. 1 depicts a network-forming reaction between trimethylol propane triacrylate (TMPTA) having 3 functional groups and one mole of polyethylene glycol (600 molecular weight) diacetoacetate (PEG600-DAA) having two functional groups to form a crosslinked film.

The resulting network is considered "gelled", or cured, despite the presence of unreacted acrylic functional groups. While further reaction can be promoted, this network cannot be made liquid either with heat or solvent because it is essentially crosslinked.

The reaction can be characterized by various ratios to describe the reactants: a mole ratio of TMPTA: PEG 600 DAA=1:1, a functional group ratio of the number of acrylate to acetoacetate functional groups=3:2, and a ratio of reactive equivalents=3:4

U.S. Pat. Nos. 5,945,489 and 6,025,410, to Moy et al. and assigned to the assignee of the present invention, disclose that certain soluble liquid uncrosslinked oligomers, made by one step Michael addition of β-dicarbonyl donor compounds (e.g., acetoacetates) to multifunctional acrylates, can be further crosslinked using ultraviolet light without requiring costly photoinitiators. Moreover, when precise proportions of multifunctional acrylate acceptor compounds to β-dicarbonyl donor compounds are combined in the presence of a basic catalyst, liquid oligomeric compositions result. If proportions below the ranges disclosed in the above-cited patent documents are used, crosslinked gels or solid products result. In addition, the disclosed liquid oligomer compositions can readily be applied to various substrates using conventional coating techniques such as roll or spray prior to ultraviolet light cure.

Multifunctional acrylates and methacrylates are commonly utilized in the preparation of crosslinked films, adhesives, foundry sand binders, and other composite materials. The invention disclosed herein demonstrates the advantageous use of these uncrosslinked resins alone or modified by reaction/blending with additional materials in coatings applications on a variety of plastic substrates. These additional materials include a variety of acrylic monomers and oligomers, primary and secondary and tertiary amines, acid-functional materials, siloxanes, elastomers, waxes and others to modify and improve coatings performance.

Coatings for plastic substrates based on the resins described above can be cured by all methods typically used to crosslink acrylic-functional materials. Cure, or crosslinking, is usually accomplished through a free radical chain mechanism, which may require any of a number of free radical-generating species such as peroxides, hydroperoxides, REDOX combinations, and other materials that decompose to form radicals, either when heated, or at ambient temperature in the presence of an amine or a transition metal promoter. Ultraviolet (UV) light or electron beam (EB) radiation are alternative means of initiating reaction by decomposing an appropriate photoinitiator to form free radicals.

The coatings described in this invention offer significant advantages over coatings based on traditional multifunctional acrylic monomers and oligomers in that they can be cured by exposure to UV radiation without the addition of a photoinitiator. Under typical UV curing conditions (~500 mJ/cm$^2$), these coatings can be effectively cured on a variety of plastic substrates with little or no added photoinitiator. Traditional multifunctional acrylates and/or oligomers will not cure upon exposure to such low doses of UV radiation unless a photoinitiator, often at relatively high levels, is added to coating formulations. Traditional photoinitiators (e.g., benzophenone) can be toxic and expensive. An additional disadvantage is that photoinitiators and/or their decomposition products may contribute to film color, which can limit applicability of the coating over white and light-colored substrates.

The novel coatings disclosed here exhibit performance properties that make them very effective across a range of plastic substrates. Traditionally, to modify the properties of photoinitiator-containing coating formulations one must admix additives, including reactive monomers or oligomers. Traditional additives can confer higher cost and may compromise some performance attributes. However, the specific properties of the coatings resulting from the present invention can be extensively modified merely by varying oligomer composition alone. Coating films can be engineered to exhibit wide ranges of hardness, toughness, flexibility, tensile strength, stain resistance, scratch resistance, impact resistance, solvent resistance, etc. Almost any desired coating performance parameter can be attained by proper selection of the raw material building blocks used to make the oligomer.

Cure of conventional multifunctional acrylate coating systems may be achieved without a UV photoinitiator. However, such systems typically require the use of an expensive, high-energy source, such as electron beam radiation, and cannot be accomplished with much cheaper UV radiation. Full cure can be realized with little or no traditional photoinitiator when the inventive oligomers are formulated into UV-curable coatings.

A coating must adequately wet out the surface of a substrate for it to adhere well to that surface. There are three principle wetting phenomena that apply to coatings: spreading, adhesional, and penetrational or immersional wetting. Spreading and adhesional wetting directly impact the application of a coating to a particular surface. Penetrational or immersional wetting impacts the application of coatings to porous surface structures and to particulate dispersions. When a coating fluid wets a surface, a second fluid, usually air, is displaced. Surface tension, both of the coating fluid and of the substrate, controls the action of wetting.

The spreading of a liquid over a solid is defined by $S_{L/S} = \gamma_{SA} - (\gamma_{LA} + \gamma_{SL})$, where, $\gamma_{SA}$ denotes the surface tension of the substrate under air, $\gamma_{LA}$ denotes the surface tension of the liquid coating under air, and $\gamma_{SL}$ denotes the interfacial tension or free energy of the substrate/liquid coating interface. A coating fluid will spread spontaneously when $S_{L/S}$ is either positive or zero. Where $S_{L/S}$ is negative, the coating will not properly wet the substrate. The resultant coating will be characterized by pinholes, fisheyes, or picture framing, and in the worst case scenario, complete de-wetting ('beading') will occur. The substrate-air surface tension cannot be controlled by the resin designer and the substrate-coating interfacial tension is assumed to be a minimum when the surface tensions of the substrate and coating fluid are nearly identical. Therefore, for best wetting, the coating surface tension should be lower than, but approximate equal to the surface energy of the substrate. Preferably, the surface tension of a coating resin should be about 3 to 10 dynes/cm less than the surface energy of the substrate.

The term adhesion refers to the attraction that molecules of one material experience towards molecules of a different material. The attraction of molecules of one material towards other molecules of the same material is cohesion. The surface tension of a liquid is a measure of its cohesion. The analogous term for a solid is surface energy. Surface tension and surface energy have the same units (dynes/cm) and surface tension is often used interchangeably to refer to the liquid or solid state. The Lewis acid/base theory is the current state of the art in understanding adhesive phenomena. Atoms are held in larger structures called molecules by two types of bonds: ionic and covalent. Similarly molecules are held in larger structures (liquids and solids) by cohesive and adhesive forces termed intermolecular forces. Approximately twenty such forces are known, most are insignificant and may be ignored to a first approximation. The dominant forces are primarily electrostatic. The theory divides intermolecular forces into two principal groups. The various names have fine shades of meaning, but are normally used interchangeably: a) LW=Liftshitz-van der Waals≈London≈non-polar≈dispersive forces; and b) AB= (Lewis) acid/base≈polar forces. Dispersion forces are always present, but acid/base forces, which may or may not be present, contribute most to functional adhesion between differing materials.

Dispersion forces play a significant role in material cohesion and contribute to functional adhesion as well. An example of strong cohesive dispersion forces is readily seen in the tremendous cohesive strength of poly(vinylidine chloride), i.e., "Saran", plastic film. It has high cohesive affinity making it "cling" to itself to provide relatively high adhesive strength. However, it has limited adhesive attraction to other plastic substrates such as polyolefin.

Plastic substrates, being widely varied in composition, exhibit a broad range of surface energies, from flouropolymers (~20 dynes/cm), silicones (~25 dynes/cm) and polyethylene/polypropylene on the low end (29–30 dynes/cm) to amorphous polyester and polyamide in the mid-range (~40 dynes/cm) and polycarbonate, poly(phenylene oxide) and polysulfones on the high end (45–50 dynes/cm). Often, surface chemistry changes over time with exposure to air and moisture, requiring coating pre-treatment to introduce a predictable surface energy for facile and effective bonding to the substrate.

The surface of untreated hydrocarbon plastics (e.g., polyolefins) tends to be molecularly inert having few, if any, moieties that can participate in electrostatic interactions. Often, the surface energy of plastic substrates is raised to values above 70 dynes/cm by pre-treatment with a technique such as corona discharge. Corona discharge treatment (CDT), in the presence of air or oxygen introduces carbonyl, carboxyl, hydroxyl, hydroperoxide, aldehyde, ether, and/or ester moieties, as well as unsaturated bonds, thereby conferring potential for adhesion based on electrostatic interactions.

A need therefore exists for UV-curable plastic coating resins that have surface tensions in a range matched to the surface energy of both untreated and surface-treated plastics and that have moieties that may participate in hydrogen bonding and other Lewis acid/base forces.

Other objects and advantages will become apparent from the following disclosure.

SUMMARY OF INVENTION

An aspect of the present invention provides coating resins is that cure under standard UV-cure conditions without the addition of traditional photoinitiators.

The present invention provides a UV-curable coating formulation for plastic substrates. The inventive formulation comprises the resinous Michael addition product of a β-dicarbonyl compound and at least one Lewis-functional multifunctional acrylate ester wherein said resin has a surface tension in the range of from about 28 to about 70 dynes/cm.

According to an aspect, the Lewis-functional multifunctional acrylate comprises a chemical moiety selected from the group consisting of hydroxyl, epoxy, amine, acid, urethane, melamine, ether, ester and mixtures thereof. According to a further aspect, the Lewis-functional moieties are present from about 0.25 to about 2.5 moieties per 100 molecular weight.

According to an aspect, the β-dicarbonyl compound is selected from the group consisting of β-keto esters, β-diketones, β-keto amides, β-keto anilides, and mixtures thereof. According to a further aspect, a preferred β-dicarbonyl compound is selected from the group consisting of methyl acetoacetate, ethyl acetoacetate, 2-(methoxyethyl) acetoacetate, glycidyl acetoacetate, acetoacetanilide, 2,4-pentanedione, and mixtures thereof.

According to an aspect, a preferred multifunctional acrylate is selected from the group consisting of polyether acrylates, polyester acrylates, epoxy acrylates, melamine acrylates, urethane acrylates, silicone acrylates, halogenated derivatives of the aforementioned classes and mixtures thereof.

A further aspect provides monofunctional acrylate monomers as modifiers that impart lower crosslink density to the cured matrix and specific interactive potential with plastic substrates. Preferred, but not limiting, monomers include ethoxy (2-ethoxy ethyl) acrylate (EOEOEA), tetrahydrofurfuryl acrylate (THFFA), lauryl acrylate and isobornyl acrylate (IBOA).

According to a further aspect, the inventive UV-curable Michael resin composition, further comprises at least one reactive monomer.

According to a further aspect, the inventive UV-curable Michael resin composition, further comprises at least one agent selected from the group consisting of flow and leveling additives, wetting agents, deaerating agents, photoinitiators, matting agents, colloidal silica, pigments, dyes, adhesion promoters and mixtures thereof. A further aspect provides compositions comprising the inventive resins blended with agents to impart toughness, scuff and mar resistance, and color.

According to an aspect, the present invention provides a method of using the inventive UV-curable coating composition, the method comprising providing a plastic substrate, providing the inventive UV-curable coating composition applying the composition to the substrate, and curing said substrate. According to a further aspect, prior to application of the inventive resins, the surface energy and or surface chemistry of the plastic substrate may be altered by treatment with a method such as corona discharge or "flame ionization".

An aspect of the present invention provides substrates coated with a Michael resin of the present invention. A further aspect provides a device loaded with the inventive resin composition.

BRIEF DESCRIPTION OF DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

It is to be noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

Reference is made to the figures to illustrate selected embodiments and preferred modes of carrying out the invention. It is to be understood that the invention is not hereby limited to those aspects depicted in the figures.

Figure 2:
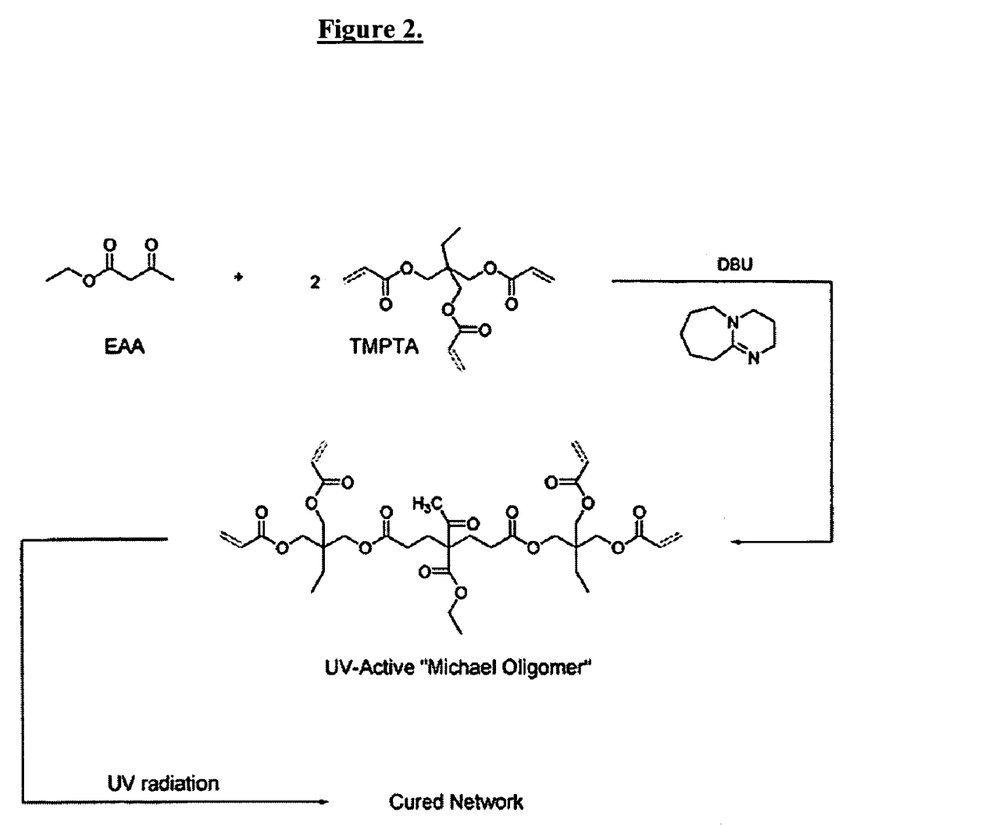
FIG. 2 shows trimethylol propane triacrylate (TMPTA) reacted with ethyl acetoacetate (EAA), in a 2:1 molar ratio, in the presence of 1,8-diazabicyclo[5.4.0]undec-7-ene (DBU) to yield a four-functional polyacrylate oligomer having dual chemical functionality.

FIG. 2 depicts the synthesis of a model Michael oligomer of the present invention. An "oligomer" of the present invention may be compared with a "resin" of a classical coating. For lexicographical convenience, the present disclosure uses "Michael resin," "Michael addition product," and "Michael oligomer" as equivalent and interchangeable terms. FIG. 2 shows the reaction of a Michael acceptor, the multifunctional (f=3) acrylate trimethylol propane triacrylate (TMPTA) reacted in a 2:1 molar ratio with a β-ketoester Michael donor, ethyl acetoacetate (EAA), in the presence of a base catalyst, 1,8-diazabicyclo[5.4.0]undec-7-ene (DBU). The resulting four-functional (f=4) polyacrylate Michael oligomer has dual chemical functionality. That is, it has both acrylic functionality and has a labile ketone group that is capable of dissociating to initiate free radical polymerization of the oligomer upon exposure to UV radiation.

An aspect of the present invention provides a liquid oligomeric composition comprising a controlled ratio mixture of a multifunctional acrylate Michael acceptor and a β-dicarbonyl Michael donor. The β-dicarbonyl Michael donor is suitably chosen from among β-keto esters, β-diketones, β-ketoamides, and β-ketoanilides. The multifunctional acrylate Michael acceptor is suitably chosen from among diacrylates, triacrylates, and tetraacrylates. The range of β-dicarbonyl donors and multifunctional acrylate acceptors affords the composition designer the opportunity to exercise a great range of selectivity in the properties of the final product.

Preferred diacrylates include, but are not limited to: ethylene glycol diacrylate, propylene glycol diacrylate, diethylene glycol diacrylate, dipropylene glycol diacrylate, triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, aryl urethane diacrylate, aliphatic urethane diacrylate, polyester diacrylate, and mixtures thereof.

Preferred triacrylates include, but are not limited to: trimethylol propane triacrylate, trifunctional acrylic s-triazine, glycerol triacrylate, ethoxylated trimethylolpropane triacrylate, propoxylated trimethylolpropane triacrylate, tris (2-hydroxyethyl) isocyanurate triacrylate, ethoxylated glycerol triacrylate, propoxylated glycerol triacrylate, pentaerythritol triacrylate, aryl urethane triacrylates, aliphatic urethane triacrylates, melamine triacrylates, epoxy novolac triacrylates, aliphatic epoxy triacrylate, polyester triacrylate, and mixtures thereof.

Preferred tetraacrylates include, but are not limited to: pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, melamine tetraacrylates, epoxy novolac tetraacrylates, polyester tetraacrylates and mixtures thereof.

In an embodiment, the β-dicarbonyl Michael donor is a β-diketone (e.g., 2, 4-pentanedione). In a preferred embodiment, the present invention is practiced with a β-ketoester (e.g., ethyl acetoacetate). The present invention is also suitably practiced with a β-ketoanilide (e.g., acetoacetanilide) or a β-ketoamide (e.g., acetoacetamide) or a mixture of Michael donors according to the desired resin quality and end use. In preferred embodiments of the present invention, the β-dicarbonyl has functionality (N) wherein N=2. β-dicarbonyl donors of higher functionality (i.e., N=4, 6 . . . ) are suitable, but more careful control of reaction stoichiometry must be exercised to avoid unwanted system gellation.

Suitable β-dicarbonyl donor compounds having functionality=2 include, but are not limited to: ethyl acetoacetate, methyl acetoacetate, 2-ethylhexyl acetoacetate, lauryl acetoacetate, t-butyl acetoacetate, 2-(methoxyethyl) acetoacetate, glycidyl acetoacetate, acetoacetanilide, N-alkyl acetoacetanilide, acetoacetamide, 2-acetoacetoxylethyl acrylate, 2-acetoacetoxylethyl methacrylate, allyl acetoacetate, benzyl acetoacetate, 2,4-pentanedione, 2,4-hexanedione, 3,5-heptanedione, isobutyl acetoacetate, and 2-methoxyethyl acetoacetate.

Suitable β-dicarbonyl donor compounds having functionality=4 include, but are not limited to: 1,4-butanediol diacetoacetate, 1,6-hexanediol diacetoacetate, neopentyl glycol diacetoacetate, cyclohexane dimethanol diacetoacetate, and ethoxylated bisphenol A diacetoacetate.

Suitable β-dicarbonyl donor compounds having functionality=6 include, but are not limited to: trimethylol propane triacetoacetate, glycerin triacetoacetate, and polycaprolactone triacetoacetates.

A preferred, but not limiting, β-dicarbonyl donor compound having functionality=8, is pentaerythritol tetraacetoacetate.

The Michael addition reaction is catalyzed by a strong base. A preferred base is diazabicycloundecene (DBU), which is sufficiently strong and is readily soluble in the monomer mixtures. Other cyclic amidines, for example diazabicyclononene (DBN) and guanidines, for example, 1,1,3,3-tetramethyl guanidine, are also suitable for catalyzing this addition reaction. Group I alkoxide bases such as potassium tert-butoxide, provided they have sufficient solubility in the reaction medium, are typically adequate to promote the desired reaction. Quaternary hydroxides and alkoxides, such as tetrabutyl ammonium hydroxide or benzyltrimethyl ammonium methoxide, comprise another class of preferred base catalysts to promote the Michael addition reaction. Finally, strong, organophilic alkoxide bases can be generated in situ from the reaction between a halide anion (e.g., quaternary halide) and an epoxide moiety. Such in situ catalysts are disclosed in pending application Ser. No. 10/255,541 assigned to Ashland, Inc., the assignee of the present application.

Michael addition of a methacrylate-functional β-dicarbonyl compound, e.g., 2-acetoacetoxyethyl methacrylate (AAEM), to a multifunctional acrylate monomer yields liquid polyacrylates with reactive pendant methacrylate groups, which can be crosslinked in a subsequent curing reaction. As the acrylate and acetoacetate are mutually reactive and the methacrylate is essentially inert under the conditions of the desired Michael addition reaction, a highly functionalized (one methacrylate per repeat unit), liquid uncrosslinked oligomer can be obtained in a one-step, solventless reaction.

The present invention confers an advantage in not requiring a solvent. However, the high selectivity of the Michael reaction permits the use of reactive diluent monomers such as styrene and methyl methacrylate as inert solvents to give low-viscosity systems that are easily incorporated by copolymerization into a variety of coating resins. Suitable, non-limiting, non-reactive solvents include styrene, t-butyl styrene, α-methyl styrene, vinyl toluene, vinyl acetate, allyl acetate, allyl methacrylate, diallyl phthalate, $C_1$–$C_{18}$-methacrylate esters, dimethacrylates, trimethacrylates and vinyl ethers.

The present invention provides a resin having residual pendant unsaturated acrylate groups. Residual pendant unsaturation means that polymerizable acrylic groups are retained by means of careful control of reactant stoichiometry. That is, there are more acrylic groups than reactive sites on the Michael donor. The nature of that addition reaction leaves pendant (versus present as part of the "backbone" of the structure where it is attached on two sides) acrylic groups away from the site of the Michael addition. Those acrylic groups are available for free radical polymerization, further Michael addition crosslinking or "pseudo Michael addition" reactions, e.g., with amines, or thiolene additions with mercaptans after UV exposure.

The properties of films formed upon UV irradiation can be modified in a number of ways including use of additional or supplementary acrylate materials, substituting and/or mixing different β-dicarbonyl compounds, or simply varying the stoichiometry of the reactants as shown. The resulting films can be made to be softer, to be more flexible, to exhibit less shrinkage, and to have greater adhesion to a variety of plastic substrates than films yielded by the reaction shown in FIG. 3. Coatings based on these novel multifunctional acrylate resins exhibit excellent adhesion and shrinkage control, flexibility, solvent resistance, scratch and mar resistance, impact resistance, color, and durability across a wide range of plastic materials. These coatings may be cured via chemical means, thermally, or by exposure to UV or electron beam radiation.

Figure 3:
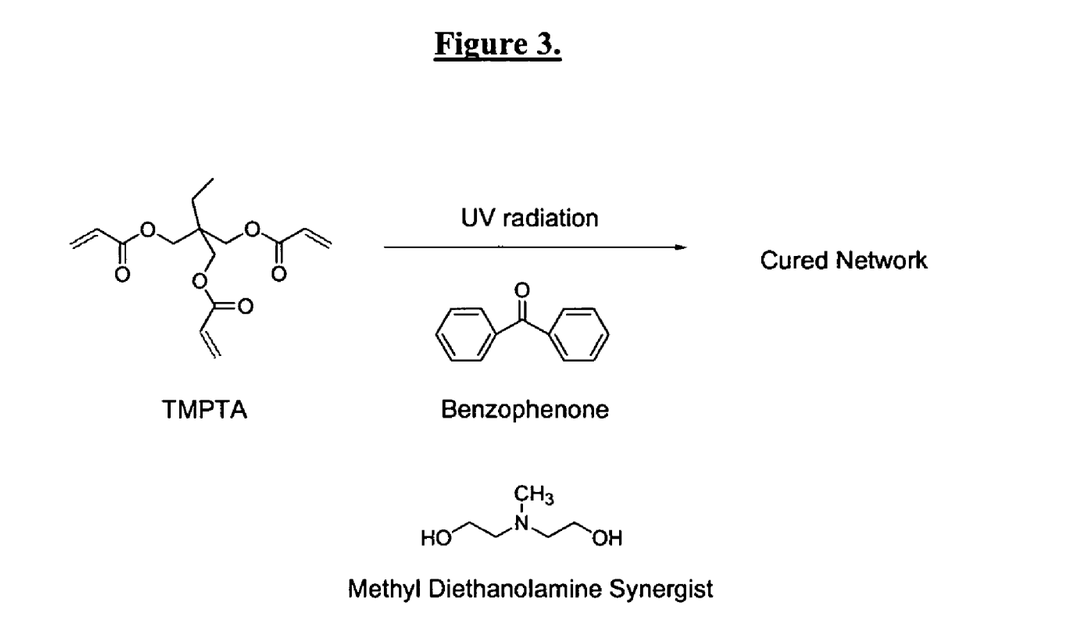
FIG. 3 is a comparative example showing trimethylol propane triacrylate (TMPTA) reacted with a photoinitiator, benzophenone, in the presence of a synergist, methyl diethanolamine.

FIG. 3 depicts a comparative example in which trimethylol propane triacrylate (TMPTA) is combined with a photoinitiator, benzophenone, and a synergist, methyl diethanolamine, to improve the efficiency of polymerization. The mixture cures to a brittle, highly crosslinked film upon exposure to UV radiation. In this example, modification of the properties of the resultant film requires mixing with supplementary acrylate constituents or formulation additives. However, acceptable levels of crosslinking by UV-cure methods, with or without added constituents, requires relatively high levels of traditional photoinitiators. In all cases where UV irradiation provides the energy source for curing, the prior art requires the use of a photoinitiator.

The present invention provides UV-curing, photoinitiator-free formulations specifically adapted to plastic substrates. An aspect of the present invention provides the incorporation of reactive (conventional multifunctional acrylates) and non-reactive (e.g., solvents) components into the formulations to enhance the coatings properties on rigid plastic substrates. These additives include a variety of acrylic monomers and oligomers, primary, secondary, and tertiary amines, acid-functional monomers and oligomers, silicones, waxes and elastomers, among others.

Systems comprised of traditional monomers and oligomers often have compatibility issues with some of the above additives, making for less formulating options. However, formulations built from the novel photo-curable oligomer resins described herein can incorporate a nearly unlimited variety of additives due to the chemical/architectural control possible in their synthesis. Thus, many more options are available to the formulator who must address specific challenges (e.g., adhesion, flexibility, color, etc.) for each particular rigid plastic substrate.

The coating formulations described in the following examples can be "reduced" with common solvents, for spray application to substrates, or applied at 100% solids by any means consistent with the shape and constitution of the substrate article. Unless otherwise noted, films of 6–10 micron thickness were produced by applying resin to various substrates using a hand-held roll coater. Cure was accomplished by exposure to a single mercury emission "H" bulb at the specified intensity and dose.

Rigid (versus flexible) substrates were gauged qualitatively. In general, the substrates had to be stiff, whether sheets or plaques, and not easily folded or distorted. Flexible films were thin films with glass transition temperatures below room temperature. They could be distorted and then restored to a flat orientation without stress cracking or visible creasing. Resin performance properties were measured by a variety of test methods familiar to those skilled in the art.

Solvent Resistance. Solvent resistance is the ability of a coating to resist solvent attack or film deformity. Rubbing the coating with a cloth saturated with an appropriate solvent is one way to assess when a specific level of solvent resistance is achieved. All rubbing tests were conducted using methyl ethyl ketone (MEK) and employed a double rub technique, one complete forward and backward motion over the coated surface. To normalize test strokes, cheesecloth was fixed to the round end of a 16-oz. ball peen hammer. The double rub technique utilizes the weight of the hammer as the operator holds the hammer at the base of the handle. This test was performed until the double rubbing action cut into the film or a noticeable film disorder was evident. The method is modified from the procedure of ASTM D4752-95.

Adhesion to plastic substrates was measured according to ASTM 2359. The test reports values OB to 5B; OB being a total failure and 5B comprises excellent adhesion. The test protocol employed two grades of tape: 1) "standard" and 2) 3M 600 ("aggressive").

Adhesion was further tested by means of a 180-degree bend test, where applicable. The test measures the subjective appearance of the coating: Y-good adhesion, only cracks upon creasing [pass]; N-poor adhesion, delamination upon creasing [fail].

The hardness of cured films was determined as Sward hardness according to ASTM D2134. The test method covers the determination of the relative degree of surface hardness of organic coatings using a specific apparatus widely used in the coatings industry. Test results are reported as the number of cycles required for a standard rocker device to come to a complete stop: hard>15; soft 10–15; very soft<10.

The surface of plastics, such as polyolefins, is virtually inert and almost always requires a surface treatment to permit wetting and adhesion. Certain plastics, such as polyamides, polycarbonates, and poly(phenylene oxides), are characterized by surface energies above about 45 dynes/cm conferred by the presence of Lewis-functional groups intrinsic to the molecular structure. Intermediate between polyolefins and the aforementioned thermoplastics on a scale of surface energy, are plastics such as polyesters, which, depending on the coating, may or may not require a surface treatment to promote wetting and adhesion. The present invention anticipates application to plastic surfaces characterized by a surface energy greater than about 35 dynes/cm. Surface treatments include, but are not limited to: corona discharge, flame, chromic acid etch, plasma, and application of primer coats.

COMPARATIVE EXAMPLES

The following examples illustrate the constitution, application, cure and performance properties of coatings detailed in this disclosure. The various plastic substrates are reported according to ASTM D4000-04, Standard Classification System for Specifying Plastic Materials, and ASTM D883-00, Standard Terminology Related to Plastics.

Example 1

UV-Curable Coating Formulations for Rigid Polycarbonate

In Example 1, a published "benchmark" (Polycarbonate II from Sartomer Technical Publication #4025, 5/02) was chosen as the comparative standard. The formulation is comprised of commercial raw materials, in parts by weight, as specified in Table 1 and is accurately representative of the current state of the art.

TABLE 1

Constituents of published "Polycarbonate II" plastics coating formulation (Sartomer Technical Bulletin #4024, 5/02).

| Raw Material | Description | Parts (w/w) | Viscosity (cps @ ° C.) |
|---|---|---|---|
| SR-368 | Tris (2-hydroxyethyl) isocyanurate triacrylate oligomer | 28.7 | Solid |
| CN-965 | Difunctional aliphatic urethane acrylate oligomer | 14.3 | 9975 (60) |
| SR-238 | Hexanediol diacrylate monomer | 21.6 | 9 (25) |
| SR-295 | Pentaerythritol tetraacrylate | 19.1 | 342 (38) |
| SR-285 | Tetrahydrofurfuryl acrylate | 9.6 | 6 (25) |
| BYK 306 | Silicone flow control additive | 1.9 | N/D |

For example 1, formulations B through G contain specific photoactive Michael Addition oligomers as "drop in" replacements for the commercial oligomers detailed in Table 1. Particular effort was made to replace only the oligomer portions of the benchmark formulation so that the resins comprising the current invention could be better compared and contrasted with the standard. Definition of each experimental oligomer is found in Table 2.

TABLE 2

Descriptions of experimental Michael oligomers based on "building blocks" and molar ratios used in comparative example 1.

| Resin Designation | Raw Materials | Description | Viscosity (cps @ ° C.) |
|---|---|---|---|
| 6796-125 | TMPTA:EAA (2.2:1) | 3,8-functional oligomer | 21,400 (50) |
| 6796-126 | TMPTA:AAA (2.2:1) | 3,8-functional oligomer | 38,900 (50) |

TABLE 2-continued

Descriptions of experimental Michael oligomers based on "building blocks" and molar ratios used in comparative example 1.

| Resin Designation | Raw Materials | Description | Viscosity (cps @ ° C.) |
|---|---|---|---|
| 6917-115 | TMPTA:[EAA/AAA/ 2,4-PD] (2.2:1) | 3.8-functional oligomer | 27,400 (50) |
| 6938-76 | Trifunctional acrylic striazine/ AAA (2.0:1) | 4.0-functional oligomer | >1,000,000 (50) |
| 6917-109 | Aliphatic urethane acrylate/ DPGDA/[EAA/AAA] 1:1:0.9 | 2.0-functional oligomer | 28,100 (25) |

Constituents of experimental formulations: EAA=ethyl acetoacetate; AAA=acetoacetanilide; 2,4-PD=2,4-pentanedione. Where multiple β-dicarbonyl compounds are indicated in brackets, the ratio refers to the sum of the various β-dicarbonyl compounds.

For both the benchmark formulation (required), and for all experimental formulations, a photoinitiator package "ladder" was evaluated in order to determine performance maxima for all formulations. The photoinitiator packages utilized are detailed in Table 3:

TABLE 3

Photoinitiator blends and amounts used in comparative example 1.

| Initiator Package | Ingredients | Parts (w/w) |
|---|---|---|
| Standard | Darocur 1173 | 3.8 |
|  | Irgacure 184 | 1.0 |
| ½ PI | Darocur 1173 | 1.9 |
|  | Irgacure 184 | 0.5 |
| ¼ PI | Darocur 1173 | 0.95 |
|  | Irgacure 184 | 0.25 |
| No PI | No photoinitiator added |  |

*Darocur and Irgacure are both trademarks of Ciba Specialty Chemicals

Oligomers and monomers were blended in parts by weight as noted in the table below. Formulation viscosities were measured and deemed acceptable as long as the formulations could be applied by standard "roll coating" equipment. Coatings were applied to commercial rigid polycarbonate sheets. Coating thicknesses ranged from 6 to 10 microns. Curing was effected with a Fusion "H" bulb at the doses and intensities specified. Dosage was quantified with an International Light IL 393 radiometer, measuring total UVA and UVB radiation between 250 and 400 nm.

TABLE 4

Rigid polycarbonate (formulation components in parts by weight).

| Component Formulation | PolycarbII A | 125 B | 126 C | 115 D | 76 E | 109 F | 76/109 G |
|---|---|---|---|---|---|---|---|
| SR-368 isocyanurate triacrylate | 28.7 | — | — | — | — | 28.7 | — |
| CN-965 aliphatic urethane diacrylate | 14.3 | — | — | — | 14.3 | — | — |
| SR-238 HDDA | 21.6 | 21.6 | 21.6 | 21.6 | 21.6 | 21.6 | 21.6 |
| SR-295 PETA | 19.1 | 19.1 | 19.1 | 19.1 | 19.1 | 19.1 | 19.1 |
| SR-285 THFFA | 9.6 | 9.6 | 9.6 | 9.6 | 9.6 | 9.6 | 9.6 |
| Byk 306 silicone additive | 1.9 | 1.9 | 1.9 | 1.9 | 1.9 | 1.9 | 1.9 |
| 6796-125 | — | 43 | — | — | — | — | — |
| 6796-126 | — | — | 43 | — | — | — | — |
| 6917-115 | — | — | — | 43 | — | — | — |
| 6938-76 | — | — | — | — | 28.7 | — | 28.7 |
| 6917-109/6938-76 | — | — | — | — | — | 14.3 | 14.3 |
| Viscosity, cps @ 25° C. | 425 | 1725 | 1125 | 800 | 2200 | 300 | 1500 |
| Minimum Dose (mJ/cm²) to Tack-Free Cure No Photoinitiator | No cure | 4350 | 2900 | 2900 | 2900 | 4350 | 2900 |
| Minimum Dose (mJ/cm²) to Tack-Free Cure ¼ Photoinitiator | No cure | 1500 | 1060 | 1060 | 1060 | 4350 | 1060 |
| Minimum Dose (mJ/cm²) to Tack-Free Cure ½ Photoinitiator | 2900 | 1060 | 580 | 580 | 410 | 2900 | 410 |
| Reduction in Energy to Cure at ½ photoinitiator (vs. standard "A" at ½ PI) |  | 63 | 80 | 80 | 86 | 0 | 86 |
| Minimum Dose (mJ/cm²) to Tack-Free Cure Standard Photoinitiator | 580 |  |  |  |  |  |  |
| Cross Hatch Adhesion (standard tape) | 5B | 5B | 5B | 5B | 5B | 5B | 5B |
| Cross Hatch Adhesion (3M 600 tape) | 5B | 5B | 5B | 5B | 5B | 5B | 5B |
| 180 degree substrate fold | Pass | Pass | Pass | Pass | Pass | Pass | Pass |
| Nail scratch adhesion | Pass | Pass | Pass | Pass | Pass | Pass | Pass |
| MEK double rubs | >200 | >200 | >200 | >200 | >200 | >200 | >200 |
| Gloss | High | High | High | High | High | High | High |

In example 1, physical test performance of all formulations cured with the 300 W/in "H" lamp, including the standard, was indistinguishable. However, experimental formulations based on oligomers 6938–76 (1-E) and 6917–109 in combination with 6938–76 (1-G) both delivered tack-free cure at 410 mJ/cm$^2$ with half the photoinitiator loading of the comparative "standard". To achieve tack-free cure, formulation 1-A required a 580 mJ/cm$^2$ dose with the full photoinitiator package. This represents a reduction in energy to cure for 1-E and 1-F of 30% AND reduction of photoinitiator content by 50% compared to the standard with the full photoinitiator package. Formulations based on oligomers –115 and –126 both gave cure equivalent to formulation 1-A (tack-free at 580 mJ/cm$^2$) with half the level of photoinitiator.

Repeating the experiment and curing with a 600 W/in lamp gave similar and even more impressive results (Table 5). The experimental formulations at ½ PI loading finished in the same order as with the 300 W/in lamp, curing with roughly 32%, on average, of the energy required to cure the standard with ½ photoinitiator loading. The standard did not cure tack-free under the test conditions with ¼ PI. At ¼ PI, the experimental formulations cured with roughly 59%, on average, of the energy required to cure the standard with ½ photoinitiator loading. Doses to cure at the ¼ PI level were particularly good for systems E and G which cured tack-free at less than 500 mJ/cm$^2$. All of the experimental formulations also cured with NO photoinitiator. At full, tack-free cure, all experimental formulations performed the same in adhesion and solvent resistance tests.

Example 2

UV-Curable Coating Formulations for Rigid ABS (acrylonitrile/butadiene/styrene)

The benchmark formulation was obtained from a vendor (UCB Chemicals) catalog. Various coatings were applied to white ABS sheets (~30 mil thick) obtained from GE Plastics (formerly Cadillac Plastics, Toledo, Ohio). One side of the sheet was smooth while another one was highly textured. All coatings were applied to the smooth side only. Coating thicknesses ranged from 10 to 16 microns. Michael Addition and standard formulations for ABS were run with photoinitiator, according to Table 6:

TABLE 6

| Initiator Package | Ingredient | phr |
| --- | --- | --- |
| Standard | Irgacure 651 | 3.0 |
| ½ PI | Irgacure 651 | 1.5 |
| No PI | No photoinitiator added | 0.0 |

TABLE 5

Rigid polycarbonate (formulation components in parts by weight).
Films were cured under a 600 W/in Fusion "H" lamp at the specified dose.

| Formulation | PolycarbII A | 125 B | 126 C | 115 D | 76 E | 109 F | 76/109 G |
| --- | --- | --- | --- | --- | --- | --- | --- |
| Viscosity, cps @ 25° C. | 425 | 1725 | 1125 | 800 | 2200 | 300 | 1500 |
| Minimum Dose (mJ/cm$^2$) to Tack-Free Cure No Photoinitiator | No cure | 1900 | 1260 | 963 | 1260 | 2080 | 1020 |
| Minimum Dose (mJ/cm$^2$) to Tack-Free Cure ¼ Photoinitiator | No cure | 728 | 708 | 649 | 451 | 1010 | 462 |
| Minimum Dose (mJ/cm$^2$) to Tack-Free Cure ½ Photoinitiator | 1125 | 358 | 382 | 393 | 261 | 480 | 256 |
| Minimum Dose (mJ/cm$^2$) to Tack-Free Cure Standard Photoinitiator | 348 | | | | | | |
| Reduction in Energy to Cure at ½ photoinitiator (vs. standard "A" at ½ PI) | | 68 | 66 | 65 | 77 | 57 | 77 |
| Reduction in Energy to Cure at ¼ photoinitiator (vs. standard "A" at ½ PI) | | 35 | 37 | 42 | 60 | 10 | 59 |
| Cross Hatch Adhesion (standard tape) | 5B | 5B | 5B | 5B | 5B | 5B | 5B |
| Cross Hatch Adhesion (3M 600 tape) | 5B | 5B | 5B | 5B | 5B | 5B | 5B |
| 180 degree substrate fold | Pass | Pass | Pass | Pass | Pass | Pass | Pass |
| Nail scratch adhesion | Pass | Pass | Pass | Pass | Pass | Pass | Pass |
| MEK double rubs | >200 | >200 | >200 | >200 | >200 | >200 | >200 |
| Gloss | High | High | High | High | High | High | High |

TABLE 7

Rigid ABS (formulation components in parts by weight). Films were cured under a 300 W/in Fusion "H" lamp at the specified dose.

| Component (all quantities in phr) | ABS "stnd." | 162/150 | 130EO | 130HD | 162 |
|---|---|---|---|---|---|
| Ebecryl 3600 (amine-modified bisphenol A diacrylate) | 40 | — | — | — | — |
| TMPTA (trimethylolpropane triacrylate monomer) | 45 | — | — | — | — |
| EOEOEA (2-(2-ethoxyethoxy) ethyl acrylate monomer) | 15 | 15 | 15 | — | — |
| 6917-162 (epoxy acrylate oligomer) | — | 40 | — | — | 100 |
| 6938-150 (acrylate oligomer) | — | 45 | — | — | — |
| 6938-130 (epoxy acrylate oligomer) | — | — | 85 | 85 | — |
| HDDA (1,6-hexanediol diacrylate monomer) | — | — | — | 15 | — |
| Viscosity, cP | 600 | 950 | 1100 | 1450 | 840 |
| Dose to Cure, mJ/cm$^2$ (300 W/in. "H" bulb) | | | | | |
| Standard PI | 520 | — | | | — |
| Minimum Dose (mJ/cm$^2$) to Tack-Free Cure ½ PI | 1070 | 440 | 520 | 520 | 285 |
| Reduction in Energy to Cure at ½ photoinitiator (vs. standard "ABS" at ½ PI) | | 59 | 51 | 51 | 73 |
| Minimum Dose (mJ/cm$^2$) to Tack-Free Cure No PI | | 800 | | | 390 |

Formulations containing Michael Addition oligomers showed a significant reduction in photoinitiator required for tack-free cure (59% on average at ½ loading). In fact, ABS-162 with no PI cured 33% faster than the benchmark with full PI. ABS-162 with 2 PI loading cured at nearly double the speed of the control formulation with full PI. All test formulations containing the various Michael addition oligomers, when cured tack-free, passed the following tests as summarized in Table 8:

TABLE 8

Measured performance values for cured ABS formulations

| Formulation | MEK | 180 degree fold | Nail Scratch | Sward hardness |
|---|---|---|---|---|
| ABS standard - full PI | 200+ | Pass | Pass | 13 |
| ABS - 162/150 - no PI | 200+ | Pass | Pass | 10 |
| ABS - 130EO - ½ PI | 200+ | Pass | Pass | 7 |
| ABS - 130HD - ½ PI | 200+ | Pass | Pass | 12 |
| ABS - 162 - no PI | 200+ | Pass | Pass | 9 |

Acrylonitrile contributes a significant measure of polarity to ABS thermoplastic, thus making adhesion relatively easy to achieve versus other plastic substrates (i.e., polyolefin). This substrate is wetted easily and provides adhesion "anchor" points. Therefore, no special substrate pretreatment was necessary. Crosshatch and direct tape application, as well as two tape types (ASTM standard, "aggressive" 3M 600) were tested. Direct tape application and crosshatch for each tape type on ABS resulted in 5B adhesion for all formulations.

Example 3

UV-Curable Coating Formulations for Rigid Polyester

The benchmark formulation for rigid polyester substrate was taken from the Sartomer Technical Bulletin #4024. Various coatings were applied to 5 mil thick commercial Polyester S sheets, a biaxially oriented sheet material similar to PET. Coatings thickness ranged from 6 to 10 microns. Michael Addition and standard formulations for polyester were run with photoinitiator, according to Table 9:

TABLE 9

| Initiator Package | Ingredient | phr |
|---|---|---|
| Standard | Darocur* 1173 | 3.8 |
| | Irgacure* 184 | 1.0 |
| ½ PI | Darocur 1173 | 1.9 |
| | Irgacure 184 | 0.5 |
| ¼ PI | Darocur 1173 | 0.95 |
| | Irgacure 184 | 0.25 |
| No PI | No photoinitiator added | 0.0 |

TABLE 10

Rigid polyester (formulation components in parts by weight). Films were cured under a 300 W/in Fusion "H" lamp at the specified dose.

| Component (all quantities in phr) | PEster "stnd." | 126 | 162BYK | 144/126/163 |
|---|---|---|---|---|
| SR 368 (isocyanurate triacrylate) | 28.7 | — | — | — |
| CN 965 (aliphatic urethane diacrylate) | 14.3 | — | — | — |
| SR 238 (HDDA) | 21.6 | 21.6 | — | 21.6 |
| SR 295 (PETA) | 19.1 | 19.1 | — | — |
| SR 285 (THFFA) | 9.6 | 9.6 | — | 9.6 |
| Byk 306 (silicone additive) | 1.9 | 1.9 | 1.9 | 1.9 |
| 6796-126 (acrylate oligomer) | — | 43 | — | 28.7 |

TABLE 10-continued

Rigid polyester (formulation components in parts by weight). Films were cured under a 300 W/in Fusion "H" lamp at the specified dose.

| Component (all quantities in phr) | PEster "stnd." | 126 | 162BYK | 144/126/163 |
|---|---|---|---|---|
| 6917-162 (epoxy acrylate oligomer) | — | — | 98.1 | — |
| 6917-144 (aliphatic urethane acrylate oligomer) | — | — | — | 14.3 |
| 6917-163 (epoxy acrylate oligomer) | — | — | — | 19.1 |
| Viscosity, cP | 425 | 1125 | 840 | 1300 |
| Dose to Cure, mJ/cm$^2$ (300 W/in. "H" bulb) | | | | |
| Standard PI | 580 | — | | |
| Minimum Dose (mJ/cm$^2$) to Tack-Free Cure ½ PI | — | 580 | — | 285 |
| Minimum Dose (mJ/cm$^2$) to Tack-Free Cure ¼ PI | — | — | — | 440 |
| Minimum Dose (mJ/cm$^2$) to Tack-Free Cure No PI | — | | 390 | |

All formulations containing Michael Addition oligomers showed a significant reduction in photoinitiator required for tack-free cure. Resin "162BYK" with no PI added cured faster than the benchmark control at full PI loading, though viscosity is double. All test formulations containing the various Michael addition oligomers, when cured tack-free, passed the tests in Table 11.

TABLE 11

Measured performance values for cured rigid polyester formulations

| Formulation | MEK | 180 degree fold | Nail Scratch |
|---|---|---|---|
| Polyester standard - full PI | 200+ | Pass | Pass |
| PEster - 126 - ½ PI | 200+ | Pass | Pass |
| PEster - 162Byk - no PI | 200+ | Pass | Pass |
| PEster - 144/126/163 - ½ PI | 200+ | Pass | Pass |
| PEster - 144/126/163 - ¼ PI | 200+ | Pass | Pass |

Adhesion to Polyester S was relatively easy to realize provided that good wetting was assured (e.g., using BYK 306 wetting agent). No special substrate pretreatment was necessary. Polyester S was used as received for adhesion testing. Crosshatch and direct tape application, as well as two tape types (ASTM standard, "aggressive" 3M 600) were tested. Direct tape application resulted in 5B adhesion for both tapes. Crosshatch adhesion with 3M 600 tape was not achieved for any of the formulations tested (Table 12). The Polyester benchmark and all Michael oligomer formulations exhibited essentially the same adhesion.

TABLE 12

Measured adhesion values for cured ABS formulations

| | Adhesion Testing Method/Tape Type | | | |
|---|---|---|---|---|
| | Direct Tape Application | | Crosshatch | |
| Formulation | Std tape | 600 Tape | Std tape | 600 Tape |
| PEster - standard | 5B | 5B | 5B | 0B |
| PEster - 126 - ½ PI | 5B | 5B | 5B | 0B |
| PEster - 162 - no PI | 5B | 5B | 5B | 0B |
| PEster - 144/126/163 - ¼ PI | 5B | 5B | 5B, 3B | 0B |

Example 4

UV-Curable Coating Formulations for Flexible and Rigid Vinyl

The benchmark formulation was based on a "low irritancy" coating for PVC ("How to Formulate UV-Curing Coatings" by R. C. W. Zwanenburg. Coatings were applied to 4–5 mil thick commercial label stock to demonstrate the utility of Michael Addition oligomers on flexible PVC. Pieces of thick white (filled) PVC consumer substrate (~70 mils thick) were used as an example of rigid PVC. Exact chemical composition (additives and amount) of either substrate is unknown. Coating thickness ranged from 12 to 16 microns on flexible PVC sheet, which agrees well with the published benchmark. Due to the presence of ridges, and overall unevenness of the consumer PVC substrate, coatings on that material were thicker and less uniform (~1–2 mils). Michael Addition and standard formulations for vinyl were run with additional photoinitiator and synergist according to Table 13.

TABLE 13

| Initiator Package | Ingredient | phr |
|---|---|---|
| Standard | Benzophenone | 4 |
| | Triethanolamine | 2 |
| | Irgacure 184 | 1 |
| ½ PI | Benzophenone | 2 |
| | Triethanolamine | 1 |
| | Irgacure 184 | 0.5 |
| ¼ PI | Benzophenone | 1 |
| | Triethanolamine | 0.5 |
| | Irgacure 184 | 0.25 |
| No PI | No photoinitiator added | 0.0 |

The following formulations were created and dose to tack-free cure recorded in Table 14.

TABLE 14

Rigid and flexible PVC (formulation components in parts by weight). Films were cured under a 300 W/in Fusion "H" lamp at the specified dose.

| Component (all quantities in phr) | PVC "Standard" | 144/150 | 144/173 | 162B |
|---|---|---|---|---|
| CN 965 (aliphatic urethane diacrylate) | 36 | — | — | — |
| SR 355 (TMPTA dimer) | 19 | — | — | — |
| SR 9003 (propoxylated NPGDA) | 29.9 | 29.9 | 29.9 | — |
| SR 285 (THFFA) | 8 | 8 | 8 | — |
| Byk 306 (silicone additive) | 0.1 | 0.1 | 0.1 | 0.1 |
| 6917-144 (aliphatic urethane acrylate oligomer) | — | 36 | 36 | — |
| 6938-150 (acrylic oligomer) | — | 19 | — | — |
| 6917-162 (epoxy acrylate oligomer) | — | — | — | 99.1 |
| 6917-173 (acrylic oligomer) | — | — | 19 | — |
| Viscosity, cP | 800 | 600 | 950 | 1300 |
| Dose to Cure, mJ/cm² (300 W/in. "H" bulb) | | | | |
| Standard PI | 520 | | | |
| Minimum Dose (mJ/cm²) to Tack-Free Cure ½ PI | | 345 | 240 | |
| Minimum Dose (mJ/cm²) to Tack-Free Cure ¼ PI | | 520 | 440 | |
| Minimum Dose (mJ/cm²) to Tack-Free Cure No PI | | | | 390 |

Formulations containing Michael Addition oligomers showed a significant reduction in photoinitiator required for tack-free cure. All Michael formulations were faster than the benchmark control at ½ PI loading, and approached or equaled the speed of the benchmark at ¼ PI loading. "Complete formulation" resin 6917-162 BYK with no PI added cured faster than the benchmark control at full PI loading, and viscosity was less than double. All Michael-based formulations demonstrated a substantial photoinitiator reduction advantage. All test formulations containing the various Michael addition oligomers, when cured tack-free, passed the tests in Table 15.

TABLE 15

Measured performance values for cured vinyl formulations

| Formulation | MEK | 180 Degree Fold (flexible sheet only) | Nail Scratch |
|---|---|---|---|
| PVC standard - full PI | 200+ | Pass | Pass |
| PVC - 144/150 - ¼ PI | 200+ | Pass | Pass |
| PVC - 144/173 - ¼ PI | 200+ | Pass | Pass |
| PVC - 162 BYK - no PI | 200+ | Pass | Pass |

Adhesion to the selected PVC substrates was relatively easy to achieve provided that good wetting was realized. No special substrate pretreatment was necessary (i.e., substrates were used "as is" for adhesion testing). Crosshatch and direct tape application, as well as two tape types (ASTM standard, "aggressive" 3M 600) were tested. Direct tape application and crosshatch for each tape type on both PVC substrates resulted in 5B adhesion for all formulations.

Example 5

UV-Curable Coating Formulations for Rigid High Density Polyethylene (HDPE)

The benchmark formulation was again taken from "How to Formulate UV-curing Coatings", by R. C. W. Zwanenburg. The various coatings were applied to commercial HDPE sheets (~575 microns). Both sides of the HDPE sheets are slightly textured. The less textured, matte finish side was used for coating. Coating thicknesses ranged from 6 to 10 microns. Michael Addition and standard formulations for HDPE were run with additional photoinitiator according to Table 16:

TABLE 16

| Initiator Package | Ingredient | phr |
|---|---|---|
| Standard | Benzophenone | 4 |
| | Irgacure 184 | 1 |
| ½ PI | Benzophenone | 2 |
| | Irgacure 184 | 0.5 |
| No PI | No photoinitiator added | 0.0 |

TABLE 17

Rigid HDPE (formulation components in parts by weight). Films were cured under a 300 W/in Fusion "H" lamp at the specified dose.

| Component (all quantities in phr) | HDPE "Standard" | 162 | 162/144 |
|---|---|---|---|
| CN 965 (aliphatic urethane diacrylate) | 15 | — | — |
| CN 704 (acrylated polyester adhesion) | 40 | — | — |
| SR 9003 (propoxylated NPGDA) | 31 | — | — |
| CN 386 (acrylated amine synergist) | 9 | — | — |
| 6917-144 (aliphatic urethane acrylate oligomer) | — | — | 30 |
| 6917-162 (epoxy acrylate oligomer) | — | 100 | 70 |
| Viscosity, cP | 2400 | 840 | 2600 |
| Dose to Cure, mJ/cm² (300 W/in. "H" bulb) | | | |
| Standard PI | 800 | — | — |
| Minimum Dose (mJ/cm²) to Tack-Free Cure ½ PI | 3000 | — | — |
| Minimum Dose (mJ/cm²) to Tack-Free Cure No PI | | 390 | 390 |

Michael-based formulas cured faster without any photoinitiator present than the benchmark HDPE formulation with a full complement of PI and had better film integrity than the benchmark formulation. Resin 162, which is a neat oligomer, cured very fast without any PI added. The addition of 30% 6917–144 to enhance adhesion and flexibility did not decrease the observed cure speed. One of the most difficult properties to be achieved on polyolefin substrates (like HDPE) is adhesion. In fact, many applications utilize corona or flame pre-treatment to ensure good uniform adhesion across the substrate surface. Adhesion to HDPE substrate, measured according to the previously described protocol, gave the results in Table 18

TABLE 18

Measured adhesion values for cured HDPE formulations

Substrate/Adhesion testing method/Tape type

| Formulation | No Corona treatment | | | | Corona Pre-treatment | | | | Flame Pre-treatment | | | |
|---|---|---|---|---|---|---|---|---|---|---|---|---|
| | Direct Tape Application | | X-hatch | | Direct Tape Application | | X-hatch | | Direct Tape Application | | X-hatch | |
| | Std Tape | 600 Tape | Std Tape | 600 Tape | Std Tape | 600 Tape | Std Tape | 600 Tape | Std Tape | 600 Tape | Std Tape | 600 Tape |
| HDPE - standard | 0B | 0B | 0B | 0B | 5B | 0B | 0B | 0B | 5B | 0B, 2B | 5B | 0B–4B |
| HDPE - 162 - no PI | 5B | 0B | 0B | 0B | 5B | 5B, 4B | 0B | 0B | 5B | 5B | 4B, 5B | 3B, 4B |
| HDPE - 162/144 - no PI | 0B | 0B | 0B | 0B | 5B | 5B | 0B | 0B | | | | |

All test formulations containing the various Michael addition oligomers, when cured tack-free, passed the tests in Table 19.

TABLE 19

Measured performance values for cured HDPE formulations

| Formulation | MEK | 180 Degree Fold | Nail Scratch |
|---|---|---|---|
| HDPE standard | 14, 18 | pass | Fail |
| HDPE - 162 - no PI | 200+ | pass | Pass |
| HDPE - 162/144 - no PI | 200+ | pass | Pass |

Example 6

UV-Curable Coating Formulations for Flexible Low Density Polyethylene (LDPE) Film and Rigid Polypropylene (PP) Substrates The LDPE/PP benchmark formulation was the same as in the previous (HDPE) example. Various coatings were applied to soft LDPE or rigid PP sheets (~30 mil thick) obtained from GE Plastics (formerly Cadillac Plastics) in Toledo, Ohio. Coating thicknesses ranged from 6 to 10 microns. The photoinitiator "package" ladder employed was the same as in the preceding section.

TABLE 20

Flexible LDPE and rigid PP (formulation components in parts by weight). Films were cured under a 300 W/in Fusion "H" lamp at the specified dose.

| Component (all quantities in phr) | HDPE/ LDPE/PP "Standard" | 93B/144 | 162 |
|---|---|---|---|
| CN 965 (aliphatic urethane diacrylate) | 15 | — | — |
| CN 704 (acrylated polyester adhesion promoter) | 40 | — | — |
| SR 9003 (propoxylated NPGDA) | 31 | 31 | — |
| CN 386 (acrylated amine synergist) | 9 | 9 | — |

TABLE 20-continued

Flexible LDPE and rigid PP (formulation components in parts by weight). Films were cured under a 300 W/in Fusion "H" lamp at the specified dose.

| Component (all quantities in phr) | HDPE/ LDPE/PP "Standard" | 93B/144 | 162 |
|---|---|---|---|
| 6675-93B (acid-functional half ester oligomer) | — | 40 | — |
| 6917-144 (aliphatic urethane acrylate oligomer) | — | 15 | — |
| 6917-162 (epoxy acrylate oligomer) | — | — | 100 |
| Viscosity, cP | 2400 | 2100 | 840 |
| Dose to Cure, mJ/cm$^2$ (300 W/in. "H" bulb) | | | |
| Standard PI | 800 | — | — |
| Minimum Dose (mJ/cm$^2$) to Tack-Free Cure ½ PI | 3000 | 1500 | — |
| Minimum Dose (mJ/cm$^2$) to Tack-Free Cure No PI | — | >5000 | 390 |

Even though Michael formulation 93B/144 cured faster than the LDPE/PP benchmark system at ½ PI loading, it did not cure tack-free with no PI added. This is attributed to the relatively large loading of 93B, a thermoplastic resin which is essential for adhesion. Neat 6917-162 Michael oligomer resin cured very fast without any added PI at one-third the viscosity of the control formulation. Experimental LDPE and PP formulations had better film integrity than benchmark formulations (higher solvent and scratch resistance) at equal or better adhesion. Adhesion testing was performed as in the previous section. Table 21 and 22 summarizes performance for LDPE and PP systems.

TABLE 21

Measured adhesion values for cured LDPE formulations

Substrate/Adhesion testing method/Tape type

| Formulation | As Is (No Corona treatment) | | | | Corona Pre-treatment | | | | Flame Pretreatment | | | |
|---|---|---|---|---|---|---|---|---|---|---|---|---|
| | Direct Tape Application | | X-hatch | | Direct Tape Application | | X-hatch | | Direct Tape Application | | X-hatch | |
| | Std Tape | 600 Tape | Std Tape | 600 Tape | Std Tape | 600 Tape | Std Tape | 600 Tape | Std Tape | 600 Tape | Std Tape | 600 Tape |
| LDPE - standard | 0B | 0B | 0B | 0B | 5B | 0B, 5B | 0B, 2B | 0B | 5B | 5B | 5B, 0B | 5B, 0B |
| LDPE - 93B/144 - ½ PI | 5B | 0B | 0B | 0B | 5B | 5B | 0B | 0B | 5B | 5B | 5B | 5B |
| LDPE - 162 - no PI | 0B | 0B, 5B | 0B | 0B | 5B | 0B, 5B | 0B | 0B | 5B | 5B | 5B | 5B |

TABLE 22

Measured adhesion values for cured PP formulations

Substrate/Adhesion testing method/Tape type

| Formulation | As Is (No Corona treatment) | | | | Corona Pre-treatment | | | | Flame Pretreatment | | | |
|---|---|---|---|---|---|---|---|---|---|---|---|---|
| | Direct Tape Application | | X-hatch | | Direct Tape Application | | X-hatch | | Direct Tape Application | | X-hatch | |
| | Std Tape | 600 Tape | Std Tape | 600 Tape | Std Tape | 600 Tape | Std Tape | 600 Tape | Std Tape | 600 Tape | Std Tape | 600 Tape |
| PP - standard | 0B | 0B | 0B | 0B | 0B, 5B | 0B | 0B | 0B | 5B | 0B | 0B | 0B |
| PP - 93B/144 - ½ PI | 0B | 0B | 0B | 0B | 0B | 0B, 5B | 0B | 0B | 5B | 5B | 0B | 0B |
| PP - 162 - no PI | Poor wetting | | | | 0B | 0B | 0B | 0B | 5B | 5B | 0B | 0B |

All test formulations containing the various Michael addition oligomers, when cured tack-free, passed the tests in Table 23.

TABLE 23

Measured performance values for cured LDPE and PP formulations

| Formulation | MEK | 180 Degree Fold | Nail Scratch |
|---|---|---|---|
| LDPE or PP standard | 8 | Pass | Fail |
| LDPE or PP - 93B/144 - ½ PI | 200+ | Pass | Pass |
| LDPE or PP - 162 - no PI | 200+ | Pass | Pass |

The coating formulations "built around" the novel polyacrylate oligomers described herein have dual chemical functionality. That is, they have both acrylic functionality and a labile ketone group that is capable of dissociating to initiate free radical polymerization of the oligomer upon exposure to UV radiation. Film properties can be modified in a number of ways including use of additional or supplementary acrylate materials, substituting EAA with any number of different B-dicarbonyl compounds, or simply varying the stoichiometry of the reactants as shown. In a variety of ways, films can be made softer and more flexible than films made from standard formulations with photoinitiator. Coatings made from this new class of photoactive oligomers demonstrate significantly better adhesion, solvent resistance and flexibility on a variety of plastic substrates. Additionally, these coatings can be cured with less energy and substantially lower (or no) photoinitiators.

INCORPORATION BY REFERENCE

All publications, patents, patent application publications, and ASTM test method publications cited in this specification are herein incorporated by reference, and for any and all purposes, as if each individual publication, patent, patent application publication, and/or ASTM test method publication were specifically and individually indicated to be incorporated by reference. In the case of inconsistencies the present disclosure will prevail. Specifically co-pending applications Ser. Nos. 10/628,373; 10/722,478; 10/712,044; 10/834,056; 10/682,874; 11/160,597; 10/834,176; 10/835,058; and 11/117,304 are hereby incorporated by reference for any and all purposes.

Having thus described our invention, what we claim as new, and desire to secure by Letters Patent is:

1. An article comprising a plastic substrate and a UV-curable Michael resin composition, wherein said UV-curable Michael resin composition comprises a resinous Michael addition product of a β-dicarbonyl compound and a Lewis-functional multifunctional acrylate ester wherein said resin has a surface tension in the range of from about 30 to about 70 dynes/cm and wherein said plastic substrate is coated with said UV-curable Michael resin composition.

2. The article according to claim 1, wherein said Lewis-functional multifunctional acrylate ester comprises a chemical moiety selected from the group consisting of hydroxyl, epoxy, amine, acid, urethane, melamine, ether, ester and mixtures thereof.

3. The article according to claim 1, wherein said β-dicarbonyl compound is selected from the group consisting of β-keto esters, β-diketones, β-keto amides, β-keto anilides and mixtures thereof.

4. The article according to claim 1, wherein said β-dicarbonyl compound is selected from the group consisting of methyl acetoacetate, ethyl acetoacetate, 2-(methoxyethyl) acetoacetate, glycidyl acetoacetate, acetoacetanilide, 2,4-pentanedione and mixtures thereof.

5. The article according to claim 1, wherein said Lewis-functional multifunctional acrylate ester is selected from the group consisting of trimethylolpropane triacrylate, dipropylene glycol diacrylate, trifunctional acrylic s-triazine, hexanediol diacrylate, pentaerythritol triacrylate, propoxylated glycol acrylates and mixtures thereof.

6. The article according to claim 1, wherein sais UV-curable Michael resin composition further comprises at least one reactive monomer.

7. The article according to claim 1, wherein said UV-curable Michael resin composition further comprises at least one agent selected from the group consisting of flaw and leveling additives, wetting agents, deaerating agents, photoinitiators, matting agents, colloidal silica, pigments, dyes, adhesion promoters and mixtures thereof.

8. The article according to claim 1, wherein said plastic substrate is treated to raise the surface energy of said plastic substrate to above 35 dynes/cm prior to coating with said DV-curable Michael resin composition.

9. The article according to claim 1, wherein said UV-curable Michael resin composition is cured.

10. A method of coating a plastic substrate comprising:
providing a resin composition comprising a resinous Michael addition product of a β-dicarbonyl compound and a Lewis-functional multifunctional acrylate ester wherein said uncrosslinked resin has a surface tension in the range of from about 30 to about 70 dynes/cm;
providing a plastic substrate;
optionally treating the said plastic substrate to raise the surface energy of said plastic substrate to above 35 dynes/cm;
applying said resin composition to said plastic substrate and
curing said resin composition.

11. The method according to claim 10, wherein said resin composition further comprises at least one agent selected from the group consisting of reactive diluent monomers, adhesion promoting monomers, flow and leveling additives, wetting agents, deaerating agents, photoinitiators, matting agents, colloidal silica, pigments, dyes, adhesion promoters and mixtures thereof.

12. The method according to claim 10, wherein said plastic substrate is treated to raise the surface energy of said plastic substrate to above 35 dynes/cm, and wherein said treatment is selected from the group consisting of corona discharge, flame, chromic acid etch, plasma, and application of primer coats.

13. The method according to claim 10, wherein applying said resin composition comprises a method selected from the group consisting of roll coating, spraying, brushing, and dip-coating.

* * * * *